(12) United States Patent
Ebner et al.

(10) Patent No.: US 10,208,596 B2
(45) Date of Patent: Feb. 19, 2019

(54) CUTTING APPARATUS

(71) Applicant: SANDVIK INTELECTUAL PROPERTY AB, Sandviken (SE)

(72) Inventors: Bernhard Ebner, Knittelfeld (AT); Christoph Haberer, Hetzendorf (AT); Georg Scherz, Zeltweg (AT)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/516,647

(22) PCT Filed: Oct. 2, 2015

(86) PCT No.: PCT/EP2015/072853
§ 371 (c)(1),
(2) Date: Apr. 3, 2017

(87) PCT Pub. No.: WO2016/055384
PCT Pub. Date: Apr. 14, 2016

(65) Prior Publication Data
US 2018/0216460 A1    Aug. 2, 2018

(30) Foreign Application Priority Data
Oct. 6, 2014   (WO) .................. PCTEP2014071334

(51) Int. Cl.
  *E21C 35/00*        (2006.01)
  *E21D 9/10*         (2006.01)
  (Continued)

(52) U.S. Cl.
  CPC ............ *E21D 9/1013* (2013.01); *E21C 25/06* (2013.01); *E21C 25/18* (2013.01); *E21C 27/24* (2013.01);
  (Continued)

(58) Field of Classification Search
  CPC ................................ E21C 27/00; E21D 9/102
  See application file for complete search history.

(56) References Cited

U.S. PATENT DOCUMENTS 1,979,050 A * 10/1934 Pratt ...................... E21C 31/00
                                                     299/75
4,486,051 A * 12/1984 Becker .................... E21C 27/24
                                                     299/65
(Continued)

FOREIGN PATENT DOCUMENTS

CN         103924970 A     7/2014
DE    20 2111 050 143 U1  10/2012
(Continued)

OTHER PUBLICATIONS

Report Information from ProQuest Dialog translation of CN103924970A 2013.*

*Primary Examiner* — Janine M Kreck
(74) *Attorney, Agent, or Firm* — Corinne R. Gorski

(57) ABSTRACT

A cutting apparatus suitable for creating tunnels and subterranean roadways includes independently pivoting supports that each carry a respective independently pivoting arm and a rotatable cutting head. Each cutting head via the supports and arms, is configured to slew laterally outward in a sideways direction and to pivot in a vertical upward and downward direction. The supports and arms are mounted on a linear moving sled carried by a main frame.

19 Claims, 9 Drawing Sheets

(51) Int. Cl.
   *E21C 27/24*    (2006.01)
   *E21C 25/18*    (2006.01)
   *E21C 29/22*    (2006.01)
   *E21C 35/06*    (2006.01)
   *E21D 20/00*    (2006.01)
   *E21C 25/06*    (2006.01)
   *E21C 35/08*    (2006.01)
   *F16H 57/023*   (2012.01)
   *F15B 11/16*    (2006.01)

(52) U.S. Cl.
   CPC .............. *E21C 29/22* (2013.01); *E21C 35/06* (2013.01); *E21C 35/08* (2013.01); *E21D 9/1026* (2013.01); *E21D 9/1033* (2013.01); *E21D 9/1093* (2013.01); *E21D 20/003* (2013.01); *F15B 11/16* (2013.01); *F16H 57/023* (2013.01); *F16H 2057/0235* (2013.01)

(56) References Cited

U.S. PATENT DOCUMENTS 5,910,066 A * 6/1999 Schulz .................. F16H 1/2863
                                                                475/331
2003/0230925 A1   12/2003   Oishi

FOREIGN PATENT DOCUMENTS

| | | |
|---|---|---|
| GB | 2060794 A | 5/1981 |
| GB | 2124407 A | 2/1984 |
| WO | 2010050872 A1 | 5/2010 |
| WO | 2011093777 A1 | 8/2011 |
| WO | 2012156841 A1 | 11/2012 |
| WO | 2012156842 A2 | 11/2012 |
| WO | 2012156884 A2 | 11/2012 |
| WO | 2014090589 A2 | 6/2014 |

\* cited by examiner

CUTTING APPARATUS

RELATED APPLICATION DATA

This application is a § 371 National Stage Application of PCT International Application No. PCT/EP2015/072853 filed Oct. 2, 2015 claiming priority of EP Application No. PCT/EP2014/071334, filed Oct. 6, 2014.

FIELD OF INVENTION

The present invention relates to rock cutting apparatus suitable for creating tunnels or subterranean roadways and in particular, although not exclusively, to undercutting apparatus in which at least one rotating head, preferably a plurality of rotating heads are capable of being slewed laterally outward and raised in the upward and downward direction during forward cutting.

BACKGROUND ART

A variety of different types of excavation machines have been developed for cutting drifts, tunnels, subterranean roadways and the like in which a rotatable head is mounted on an arm that is in turn movably mounted at a main frame so as to create a desired tunnel cross sectional profile. WO2012/156841, WO 2012/156842, WO 2010/050872, WO 2012/156884, WO2011/093777, DE 20 2111 050 143 U1. All described apparatus for mill cutting of rock and minerals in which a rotating cutting head forced into contact with the rock face as supported by a movable arm. In particular, WO 2012/156884 describes the cutting end of the machine in which the rotatable heads are capable of being raised and lowered vertically and deflecting in the lateral sideways direction by a small angle in an attempt to try enhance the cutting action.

WO 2014/090589 describes a machine for digging roadways tunnels and the like in which a plurality of cutting heads are movable to dig into the rock face via a pivoting arcuate cutting path. US 2003/0230925 describes a rock excavator having a cutter head mounting a plurality of annular disc cutters suitable to operate in an undercutting mode.

It has been observed that during the slewing operation of the at least one arm, significant torque needs to be transmitted in particular when operating in undercutting mode. Mechanisms which allow for high torque transmission however entail the drawback of very low transmission speeds, thus limiting the overall mine development progress.

Furthermore, it has been observed that due to specific geophysical attributes of the mining sites at different locations, the mining equipment, in particular rock cutting apparatus, needs to be specifically customized in order to ideally cope with the working environment. It has been found in conventional systems that the design and modification of existing mining equipment for adapting the equipment to the regional environment is time consuming and costly.

Furthermore, it has been observed that conventional cutting machines are not optimised to cut hard rock having a strength typically beyond 120 MPa whilst creating a tunnel or subterranean cavity safely and reliably of desired cross sectional configuration. Accordingly, what is required is a cutting machine that addresses these problems.

SUMMARY OF THE INVENTION

It is an objective of the present invention to provide a cutting apparatus which allows for reliable torque transmission, in particular for undercutting operation of the cutting head while at the same time allowing for time-efficient, rapid mine development.

It is a further objective of the present invention to provide a cutting machine suitable to form tunnels and subterranean roadways being specifically configured to cut hard rock beyond 120 MPa in a controlled and reliable manner. It is a further specific objective to provide a cutting machine capable of creating a tunnel with a variable cross sectional area within a maximum and a minimum cutting range. It is a further specific objective to provide a cutting (excavator) machine operable in an 'undercutting' mode according to a two stage cutting action.

According to a first aspect of the present invention there is provided a cutting apparatus for creating tunnels or subterranean roadways and the like comprising: at least one arm pivotally mounted to the apparatus and adapted to pivot in an upward and downward direction; at least one arm actuator to actuate pivoting movement of the at least one arm; wherein the actuator comprises a drive motor unit and a drive train coupled to the drive motor unit, the drive motor unit and drive train being configured for selective operation in one of: a first operating mode in which a first pivoting velocity and first torque are transmitted to the at least one arm, or a second operating mode in which a second velocity and second torque are transmitted to the at least one arm, the first velocity being lower than the second velocity and the first torque being higher than the second torque. The aforementioned solution provides the following benefits: By splitting up the mechanism into a first operating mode and a second operating mode, it becomes possible to unify the advantages of two otherwise contradicting goals; The first operating mode provides for higher torque at lower velocities, while the second operating mode provides for higher velocity at lower torque. With a single operation mode, it may be possible to operate at different velocities. However, the torque which is defined by the drive train would then limit the maximum velocity range achievable by the mechanism. According to the invention, it is possible to deliberately switch between the first and second operation mode such that when arm movement at higher speeds is required, the second operation mode can be used. By providing a lower amount of torque therewith, the drive train automatically operates at higher speeds.

Preferably, the first operation mode is used for upward movement of the arm, i.e. for rock cutting, particularly undercutting. The second operation mode preferably is used for moving the arm downwards, such as after completing a cutting movement and prior to moving the machine into the next cutting position. By lowering the torque for the second operational mode relative to the first mode, arm movement becomes potentially less dangerous with regard to possible collateral damage to machinery or personnel standing near the arm.

In a further preferred embodiment, the drive motor unit comprises a first drive motor and a second drive motor, the first drive motor applying torque to the drive train in the first operating mode, and the second drive motor applying torque to the drive train in the second operating mode. By using two individual drive motors for the first and second operation modes, control of the cutting apparatuses operating modes becomes particularly easy to handle.

In a further preferred embodiment, the drive train comprises an auger drive and a planetary drive coupled to one another in series. The combination of auger drive and planetary drive coupled to one another in series provides for a very robust drive train which is able to generate very high reduction ratios. It also allows for very compact overall design in relation to the achievable reduction ratio. In general, the rock cutting apparatus can easily be adapted regarding its two operating modes by substituting the auger drive and for planetary drive with a differently dimensioned alternative. Thus different transmission ratios can be installed easily.

The auger drive preferably comprises an auger and an auger wheel which are in engagement with each other. The auger wheel preferably is the input element of the drive train, and the auger wheel preferably is coupled to an input shaft of the planetary drive, i.e. coupled to the sun wheel of the planetary drive.

Preferentially, the planetary drive has a first stage planetary drive, the drive train further comprising at least a second stage planetary drive coupled in series to the first stage planetary drive. By coupling two planetary drives in series to one another, even greater transmission ratios are achievable while consuming very little space in the axial dimension of the drive train. Preferably, the first stage planetary drive comprises a first sun wheel, a number of planetary wheels engaged by the sun wheel, a first planetary carrier coupled to the planetary wheels and a first hollow wheel engaged by the planetary wheels. It is further preferred if the first planetary carrier is coupled to a second sun wheel (pertaining to the second stage planetary drive). The second stage planetary preferably drive further comprises a number of planetary carriers carrying planetary wheels and a second hollow wheel being engaged by the planetary wheels. Furthermore, the second stage planetary drive preferably comprises a third hollow wheel engaged by the planetary wheels of the second stage planetary drive.

In a particularly preferred alternative embodiment, the second stage planetary drive is a Wolfrom type drive. The Wolfrom type drive qualifies as a high reduction type gear box and preferably comprises two hollow wheels, one of which is fixed to the rock cutting apparatus. The planetary wheels of the second stage planetary drive engage both hollow wheels. Both hollow wheels of the Wolfrom type drive have an identical module, but differing teeth numbers. Consequently, after the planetary carrier driven by the planetary wheels has performed one full revolution, the second hollow wheel has moved by a very small amount, namely the differing number in teeth, with respect to the fixed hollow wheel. The result is an extreme transmission ratio which is particularly beneficial for the intended use of the cutting apparatus according to the invention.

As a mechanically less complex alternative to the Wolfrom type drive, which is also easier to calculate, it is alternatively preferred if the drive train comprises a third stage planetary drive coupled in series to the second stage planetary drive. While requiring larger axial dimensions for the drive train, it is still possible to create satisfactory transmission ratios with this alternative solution.

According to a further preferred embodiment, the auger drive comprises an auger, and the first drive motor is coupled to the auger. It is further preferred if the planetary drive comprises a first hollow gear, and the second drive motor is coupled to the first hollow gear. By making the first drive motor engage the first stage of the drive train, while the second drive motor engages the second stage of the drive train, it becomes particularly easy to define distinct operating modes with well defined transmission ratios and thus well defined sets of velocity and torque, respectively. By selectively operating the first drive motor or the second drive motor, the power transmission is initiated upstream of the auger drive, thus using the entire reduction ratio of the first and second stages. A selective operation of only the second drive motor presents a convenient bypass of the first stage of the drive train. Instead, the first hollow gear is then directly driven by the second drive motor to initiate torque transmission through the second stage of the drive train.

According to a further preferred embodiment, the apparatus comprises a first brake configured to prevent any torque transmission from the first drive motor to the arm. Further, it is preferred if the cutting apparatus comprises a second brake configured to prevent any torque transmission from the second drive motor to the arm.

Selective braking of the respective inactive drive motor ensures that in each operating mode, the arm is actuated at the appropriate velocity and torque which is predefined by the two stages of the drive train and the drive motors. The brakes preferably operate by immobilizing the auger and/or auger wheel of the auger drive (first brake), or by immobilizing the first hollow gear (second brake).

Preferably, the drive train comprises a second hollow wheel and a third hollow wheel, both associated with the second stage planetary drive, wherein the second and third hollow wheel have an identical gear module, and the number of teeth of the second hollow wheel differs from the number of teeth of the third hollow wheel. The difference in teeth preferably is in the two-digit range or less, preferably in the one-digit range, and particularly preferred between 1 and 5.

The above-mentioned preferred embodiments allow for a wide range of transmission ratios.

In particularly preferred embodiments, in the first operating mode, the gear transmission ratio of the drive train is in the range of 5,000 to 10,000, preferably 7,000 to 9,000, and most preferably 8,000; and/or in the second operating mode, the gear transmission ratio of the drive train is in the range of 500 to 2,000, preferably 700 to 1,200, and most preferably 850. The aforementioned ranges of transmission ratios provide a surprisingly good balance of velocity and torque for the intended purposes of actuating the arms for cutting operation and repositioning the arms prior to machine movement.

It is particularly preferred for the cutting apparatus if the first and second drive motors are hydraulic motors, and preferably are identical motors. Under "identical" it shall be understood that the motors at least have substantially the same nominal power output. Preferably, identical shall be understood to mean that the motors are of identical build, thus reducing part complexity of the entire cutting apparatus and also facilitating motor control programming.

Preferably, the cutting apparatus of the invention further comprises a rotatable cutting head mounted at the at least one arm, the head being rotatable about a head axis orientated to extend substantially transverse to the arm pivot axis, In a further aspect, the invention achieves its objective by suggesting a cutting apparatus comprising at least one arm rotatably mounted to a support and driven by an arm actuator, the arm actuator comprising a drive train, said drive train having at least a first stage and a second stage planetary drive coupled to one another in series, with a first hollow wheel being mounted on the support, and a second hollow wheel being coupled to the arm, such that the support and the arm are rotatable with respect to one another. Preferably, the first and second stage planetary drives constitute a Wolfrom gear. The mining apparatus of this aspect preferably is enhanced in accordance with any combination of features of the preferred embodiments described hereinabove and hereinbelow.

For practical purposes, while perfectly well possible to operate with one arm only, it is preferred if the cutting apparatus according to anyone of the aforementioned preferred embodiments further comprises two individually actuatable arms. The general concept and benefits of these two individually operable arms are elucidated further herein below.

Preferably, the cutting apparatus thus further comprises: a second arm pivotally mounted to the apparatus, the first and second arm being adapted to pivot independently of one another in an upward and downward direction; comprising for each arm an arm actuator to actuate independently the pivoting movement of the first and second arms; a rotatable cutting head mounted at each of the first and second arms, each head rotatable about a head axis oriented to extend substantially transverse to each respective arm pivot axis. Preferably, the cutting apparatus comprises a main frame having generally upward, downward and side facing regions; a first and second support pivotally mounted relative to the main frame via respective first and second support axes aligned generally upright relative to the upward and downward facing regions such that each first and second support is configured to pivot laterally in a sideways direction relative to the side facing regions; at least one first and second support actuator to respectively actuate independently movement of each of the first and second supports relative to the main frame; wherein the first and second arms are each pivotally mounted to the respective first and second support via a respective arm pivot axis aligned in a direction extending transverse including perpendicular to each support pivot axis to enable the first and second arms to pivot independently of one another and to pivot relative to each of the respective first and second supports in an upward and downward direction relative to the upward and downward facing regions; and wherein the at least one first and second arm actuators are adapted to actuate independently the pivoting movement of the first and second arms relative to each of the respective first and second support.

The further objectives are achieved by providing a cutting apparatus having a plurality of rotatably mounted cutting heads that may be pivoted in an upward and downward direction and a lateral side-to-side direction via a plurality of independently pivoting booms mounted at a main frame. In particular, each boom comprises a support pivotally mounted to the main frame and carrying an arm via a respective additional pivot mounting such that each cutting head is capable of pivoting about two pivoting axes. The desired range of movement of each head is provided as the dual pivoting axes are aligned transverse (including perpendicular) to one another and are spaced apart in the longitudinal direction of the apparatus between a forward and rearward end.

Advantageously, the cutting heads comprise a plurality of disc-like roller cutters distributed circumferentially around a perimeter of each head so as to create a groove or channel into the rock face as the heads are driven about their respective rotational axes. The heads may then be raised vertically so as to overcome the relatively low tensile strength of the overhanging rock to provide breakage via force and energy that is appreciably lower than a more common compressive cutting action provided by cutting picks and the like.

According to a further aspect of the present invention there is provided cutting apparatus suitable for creating tunnels or subterranean roadways and the like comprising: a main frame having generally upward, downward and side facing regions; a first and second support pivotally mounted relative to the main frame via respective first and second support axes aligned generally upright relative to the upward and downward facing regions such that each first and second support is configured to pivot laterally in a sideways direction relative to the side facing regions; at least one first and second support actuator to respectively actuate independently movement of each of the first and second supports relative to the main frame; a first and second arm each pivotally mounted to the respective first and second support via a respective arm pivot axis aligned in a direction extending transverse including perpendicular to each support pivot axis to enable the first and second arms to pivot independently of one another and to pivot relative to each of the respective first and second supports in an upward and downward direction relative to the upward and downward facing regions; at least one first and second arm actuator to actuate independently pivoting movement of the first and second arms relatives to each of the respective first and second support; a rotatable cutting head mounted at each of the first and second arms, each head rotatable about a head axis orientated to extend substantially transverse to each respective arm pivot axis.

Reference within this specification to each head being rotatable about a head axis orientated to extend substantially transverse to each respective arm pivot axis includes (or encompasses) a perpendicular alignment. Such a reference also encompasses the respective pivot axes intersecting or more preferably not intersecting with the rotational axes of the cutting heads. Optionally, the rotational axes of the cutting heads are positioned generally in front of and/or above the respective pivot axes of the pivot arms.

Optionally, each cutting head comprises a generally annular cutting edge or layered cutting edges to provide an undercutting mode of operation. The configuration of each head to provide the undercutting action is advantageous to break the rock with less force and in turn provide a more efficient cutting operation that draws less power.

Preferably, the apparatus comprises a plurality of roller cutters independently rotatably mounted at each rotatable cutting head. Preferably, the roller cutters are generally annular roller cutters each having a generally annular cutting edge or layered cutting edges to provide an undercutting mode of operation. More preferably, the roller cutters are mounted at a perimeter region of each cutting head such that the roller cutters circumferentially surround each cutting head. Such a configuration is advantageous to provide the undercutting action of the apparatus with the roller cutters first creating a channel or groove extending generally horizontally in the rock face. The roller cutters may then be moved upwardly to break the rock by overcoming the tensile forces immediately above the channel or groove. A more efficient cutting operation is provided requiring less force and drawing less power. Preferably, the roller cutters are mounted at generally cylindrical bodies and comprise generally annular cutting edges distributed around the perimeter of the cutting head. Each generally circular cutting edge is accordingly positioned side-by-side around the circumference of the cutting head with each cutting edge representing an endmost part of each pivoting arm. Preferably an alignment of the rotational axes of the roller cutters relative to the rotational axis of the respective cutting head is the same so that the respective cutting edges are all orientated in the same position around the cutting head.

Preferably, each of the first and second arm actuator comprises a planetary gear assembly mounted at the junction at which each arm pivots relative to each support. The subject invention may comprise a conventional planetary gear arrangement such as a Wolfram type planetary gear having a high gear ratio. The planetary gear assembly is mounted internally with each arm such that the cutting apparatus is designed to be as compact as possible. Preferably, the apparatus further comprises at least one first drive motor to drive the pivoting movement of the first and/or second arm relative to the respective first and second support and the main frame. Preferably, the apparatus comprises two drive motors to drive each of the first and second arms about their pivoting axis via the respective planetary gears. Preferably, the respective drive motors are mounted in-board of each arm and are coupled to each arm via the planetary gear assembly and/or an intermediate drive transmission.

Preferably, the apparatus further comprises at least one second drive motor to drive rotation of the cutting head at the first and/or the second arm. Preferably, each head comprises two drive motors mounted at the side of each arm. Such an arrangement is advantageous to pivot each drive motor with each cutting head and to provide a direct drive with minimal intermediate gearing.

Optionally, the first and second support actuator comprises a hydraulic linear actuator. Preferably, each support actuator comprises a linear hydraulic cylinder positioned at the lateral sides of the sled and coupled to extend between the sled and an actuating flange extending laterally outward from each support. Such an arrangement is advantageous to minimise the overall width of the apparatus whilst providing an efficient mechanism for the sideways lateral slewing of each support and accordingly each arm.

Optionally, the sled may be positioned to operate longitudinally between the supports and each of the respective arms. That is, each arm may be configured to slide in the axially forward direction relative to each support via one or a plurality of actuators. Optionally, each arm is connected to each support via a respective sliding actuator such that each arm is configured to slide independently relative to one another. Optionally, each arm may be configured to slide in a forward and rearward direction relative to each support via a coordinated parallel sliding mechanism.

Preferably, the apparatus further comprises a powered sled movably mounted at the main frame to be configured to slide in a forward cutting direction of the apparatus relative to the main frame. The apparatus may further comprise a plurality of 'runners' or guide rails to minimise the frictional sliding movement of the sled over the main frame. Preferably, the apparatus comprises at least one powered linear actuator to provide the forward and rearward movement of the sled relative to the main frame. As will be appreciated, the sled may be configured to move axially/longitudinally at the machine via a plurality of different actuating mechanisms including rack and pinion arrangements, belt drive arrangements, gear arrangements and the like. Preferably the supports and the arms are mounted at the sled and are all configured to move in the forward and rearward direction collectively.

Optionally, each of the first and second arms is configured to pivot in the upward and downward direction by up to 180°. Optionally, each arm may be configured to pivot over a range of up to 155°. Optionally, the first and second supports are configured to pivot in the lateral sideways direction by up to 90°. Optionally, the supports may be configured to pivot up to 20° in the lateral sideways direction. Such a configuration provides control of the profile shape and avoids any cuts or ridge that would otherwise remain on the roof and floor of the as-formed tunnel.

Preferably, the apparatus comprises tracks or wheels mounted at the main frame to allow the apparatus to move in a forward and rearward direction. The tracks or wheels enable the apparatus to be advanced forwardly and rearwardly within the tunnel both when manoeuvred into and from the cutting face between cutting operations and to be advanced forwardly during cutting operations as part of the cut-and-advance cutting cycle that also utilises the sliding sled.

Preferably, the apparatus further comprises floor and roof engaging members mounted at the main frame, at least the floor engaging members being extendable and retractable to respectively raise and lower the apparatus in the upward and downward direction. The engaging members are configured to wedge the apparatus in position between the roof and floor of the tunnel to provide points of anchorage against which the machine may be braced to allow the cutters to be forced against the rock face.

Preferably, the apparatus further comprises a first material discharge conveyor to convey cut material rearwardly from the first and second cutting head; and a gathering head to direct cut material onto the conveyor, the gathering head positioned rearwardly behind at least one of the first and second cutting heads. The apparatus is accordingly configured to transport rearwardly material from the cut face to provide unhindered forward cutting movement into the rock.

Preferably, the apparatus further comprises a control unit demountably connectable to the apparatus, the control unit comprising operational components to power at least the first and second support and arm actuators, the control unit further comprising a second conveyor to receive material from the first conveyor and to discharge the material at a position rearward of the apparatus and the control unit. Preferably, the control unit is demountably coupled to the apparatus so as to be capable of being advanced and retracted in the forward and rearward directions with the cutting apparatus. Preferably, the control unit is suspended above the tunnel floor by suitable couplings to the apparatus. The control unit may comprise ground engaging support members provided at a rearward and/or forward regions. Optionally, the control unit may be attachable at its rearward end to a material collection and discharge vehicle and to be connectable at its forward end to the cutting apparatus.

According to a further aspect of the present invention there is provided cutting apparatus suitable for creating tunnels or subterranean roadways and the like comprising: a main frame having generally upward, downward and side facing regions; a powered sled movably mounted at the main frame to be configured to slide in a forward cutting direction of the apparatus relative to the main frame; a first and second arm pivotally coupled or mounted to the sled by respective pivot arm axes aligned in a direction extending transverse including perpendicular to a longitudinal axis of the main frame to allow each arm to pivot independently of one another in an upward and downward direction relative to the upward and downward facing region of the main frame; at least one first and second arm actuator to actuate independent pivoting movement of the first and second arms relative to one another and the main frame; a rotatable cutting head mounted at each of the first and second arms so as to be configured to be moved in the upward and downward direction and advanced in the forward cutting direction, each head rotatable about a head axis orientated to extend substantially transverse to respective pivot arm axes.

Optionally, the first and second arm together with the respective pivot arm axes are respectively coupled or mounted to the sled via a first and second support, the first and second supports are slidably mounted relative to the sled via a common or respective slidable means such that each first and second support is configured to slide laterally in a sideways direction relative to the side facing regions. The first and second supports are mounted at the sled and configured to slide laterally cross the sled substantially perpendicular to the forward and backward sliding movement of the sled relative to the main frame.

Optionally, each rotatable cutting head comprises a generally annular roller cutter each having a generally annular cutting edge or layered cutting edges to provide an undercutting mode of operation.

Preferably, the apparatus further comprises a plurality of roller cutters independently rotatably mounted at each rotatable cutting head. Optionally, the plurality of roller cutters are generally annular roller cutters each having a generally annular cutting edge or layered cutting edges to provide an undercutting mode of operation.

According to a further aspect of the present invention there is provided cutting apparatus configured to create a cutting profile via an undercutting operation to create tunnels and subterranean roadways, the apparatus comprising: a main frame; a first and second arm pivotally mounted to the main frame by respective pivot arm axes aligned in a direction extending transverse including perpendicular to a longitudinal axis of the main frame to allow each arm to pivot independently of one another in an upward and downward direction relative to an upward and downward facing region of the main frame; at least one first and second arm actuator to actuate independent pivoting movement of the first and second arms relative to one another and the main frame; a rotatable cutting head mounted at each of the first and second arms, each cutting head comprising generally annular roller cutters each having a generally annular cutting edge to provide an undercutting mode of operation.

Preferably, the apparatus comprises a first and second support pivotally mounted relative to the main frame via respective first and second support axes aligned generally upright relative to the upward and downward facing regions such that each first and second support is configured to pivot laterally in a sideways direction relative to the side facing regions.

Preferably, the apparatus further comprises a powered sled movably mounted at the main frame, the first and second arms mounted at the sled so as to be capable of longitudinal reciprocating movement to slide in a forward cutting direction of the apparatus to engage the roller cutters into the rock face.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
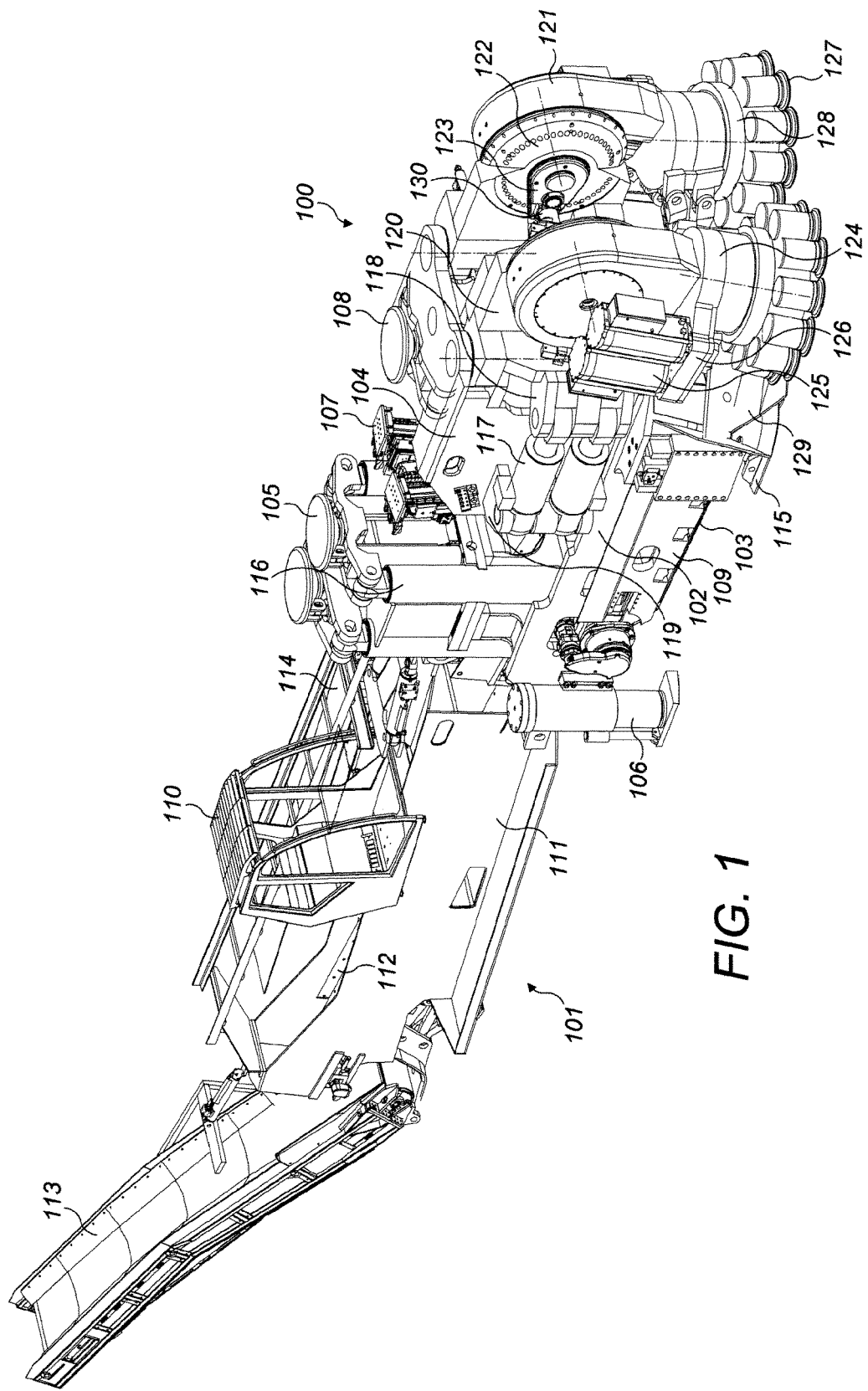
FIG. 1 is a front perspective view of a mobile cutting apparatus suitable for creating tunnels or subterranean roadways having a forward mounted cutting unit and a rearward control unit according to a specific implementation of the present invention.

Referring to FIG. 1, cutting apparatus 100 comprises a main frame 102 mounting a plurality of cutting components configured to cut into a rock or mineral face to create tunnels or subterranean roadways. Apparatus 100 is configured specifically for operation in an undercutting mode in which a plurality of rotatable roller cutters 127 may be forced into the rock to create a groove or channel and then to be pivoted vertically upward so as to overcome the reduced tensile force immediately above the groove or channel and break the rock. Accordingly, the present cutting apparatus is optimised for forward advancement into the rock or mineral utilising less force and energy typically required for conventional compression type cutters that utilise cutting bits or picks mounted at rotatable heads. However, the present apparatus may be configured with different types of cutting head to those described herein including in particular pick or bit type cutting heads in which each pick is angularly orientated at the cutting head to provide a predetermined cutting attack angle.

Figure 2:
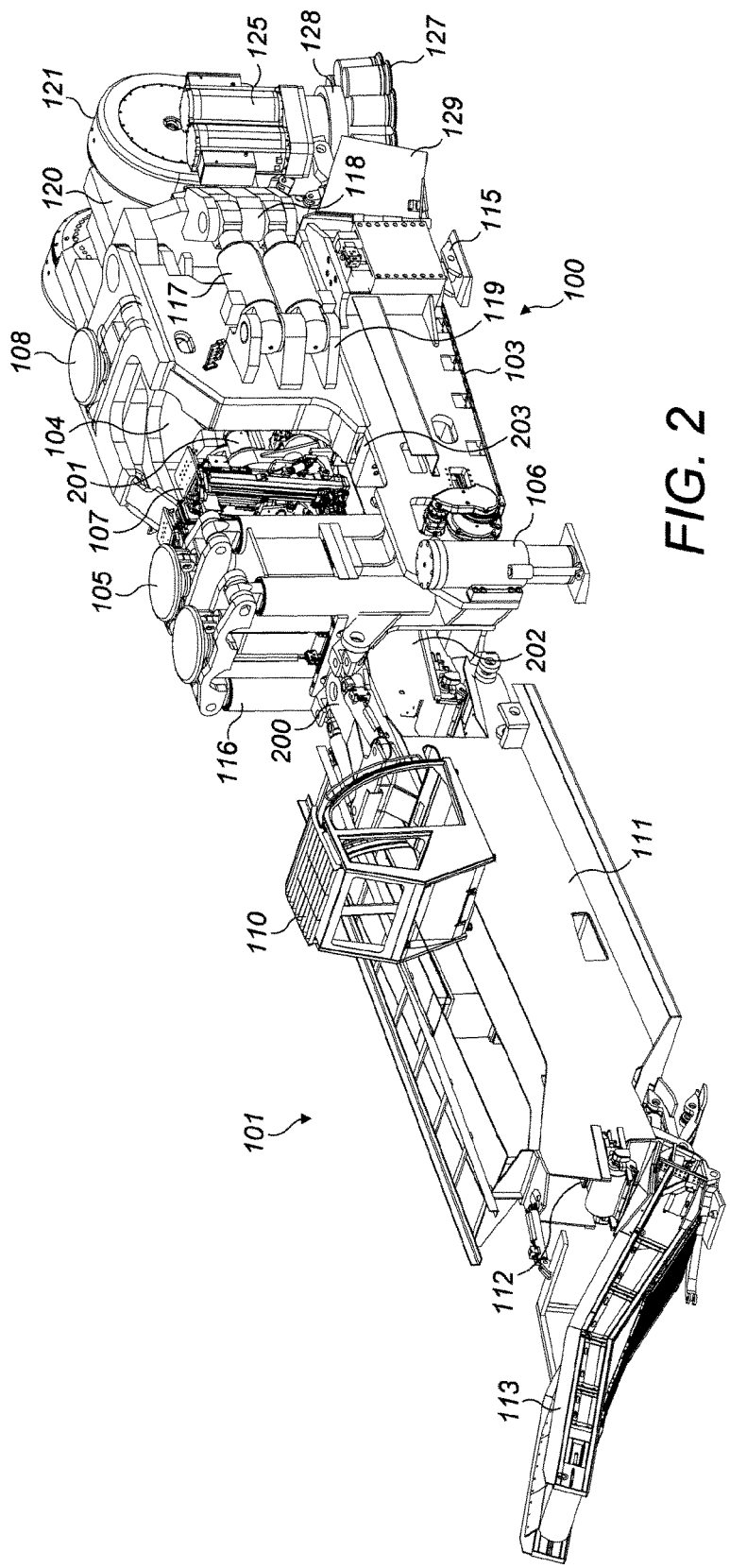
FIG. 2 is a rear perspective view of the cutting apparatus of FIG. 1.
Figure 3:
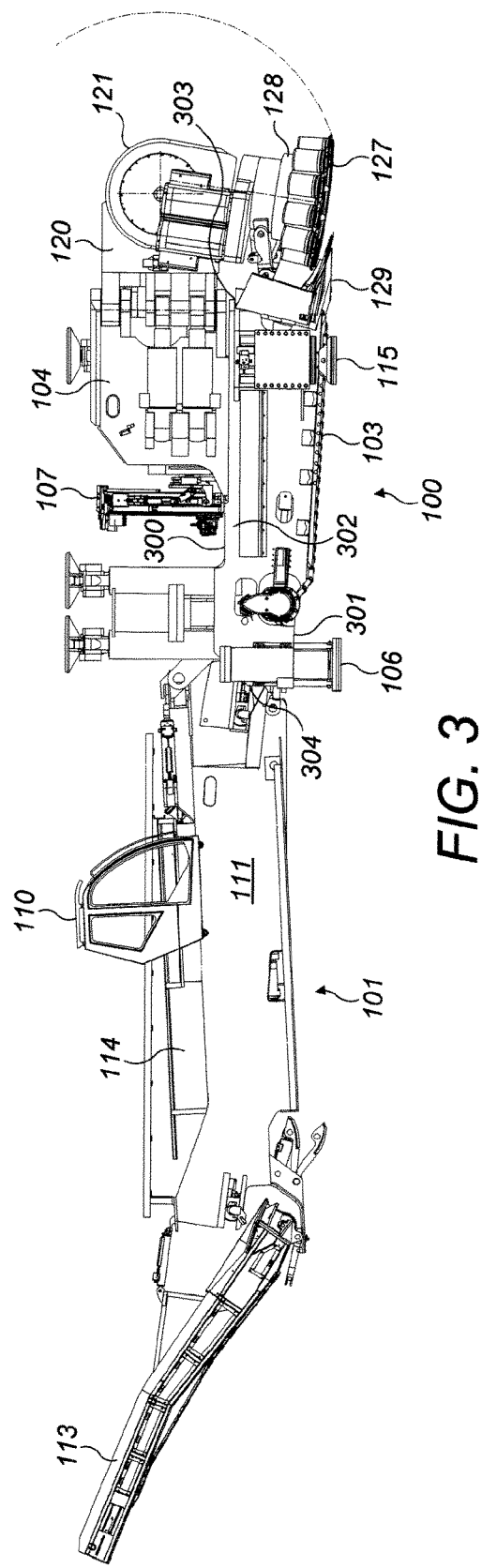
FIG. 3 is a side elevation view of the apparatus of FIG. 2.

Referring to FIGS. 1 to 3, main frame 102 comprises lateral sides 302 to be orientated towards the wall of the tunnel; an upward facing region 300 to be orientated towards a roof of the tunnel; a downward facing region 301 orientated to be facing the floor of the tunnel; a forward facing end 303 intended to be positioned facing the cutting face and a rearward facing end 304 intended to be positioned facing away from the cutting face.

An undercarriage 109 is mounted generally below main frame 102 and in turn mounts a pair of crawler tracks 103 driven by a hydraulic (or electric) motor to provide forward and rearward movement of apparatus 100 over the ground when in a non-cutting mode. A pair of rear ground engaging jacking legs 106 are mounted at frame sides 302 towards rearward end 304 and are configured to extend and retract linearly relative to frame 102. Frame 102 further comprises a forward pair of jacking legs 115 also mounted at each frame side 302 and towards forward end 303 and being configured to extend and retract to engage the floor tunnel. By actuation of legs 106, 115, main frame 102 and in particular tracks 103 may be raised and lowered in the upward and downward direction so as to suspend tracks 103 off the ground to position apparatus 100 in a cutting mode. A pair of roof engaging grippers 105 project upwardly from main frame 102 at frame rearward end 304 and are extendable and retractable linearly in the upward and downward direction via control cylinders 116. Grippers 105 are therefore configured to be raised into contact with the tunnel roof and in extendable combination with jacking legs 106, 115 are configured to wedge apparatus 100 in a stationary position between the tunnel floor and roof when in the cutting mode.

A sled 104 is slidably mounted on top of main frame 102 via a slide mechanism 203. Sled 104 is coupled to a linear hydraulic cylinder 201 such that by reciprocating extension and retraction of cylinder 201, sled 104 is configured slide linearly between frame forward and rearward ends 303, 304.

A pair of hydraulically actuated bolting units 107 are mounted at main frame 102 between sled 104 and roof gripping unit 105, 116 relative to a lengthwise direction of the apparatus. Bolting units 107 are configured to secure a mesh structure (not shown) to the roof of the tunnel as apparatus 100 is advanced in a forward cutting direction. Apparatus 100 also comprises a mesh support structure (not shown) mounted generally above sled 104 so as to positionally support the mesh directly below the roof prior to bolting into position.

A pair of supports 120 are pivotally mounted at and project forwardly from sled 104 immediately above frame forward end 303. Supports 120 are generally spaced apart in a lateral widthwise direction of the apparatus 100 and are configured to independently pivot laterally outward from one another relative to sled 104 and main frame 102. Each support 120 comprises a forward end 503 and a rearward end 504 referring to FIG. 5. A first mount flange 118 is provided at support rearward end 504 being generally rearward facing.

Figure 5:
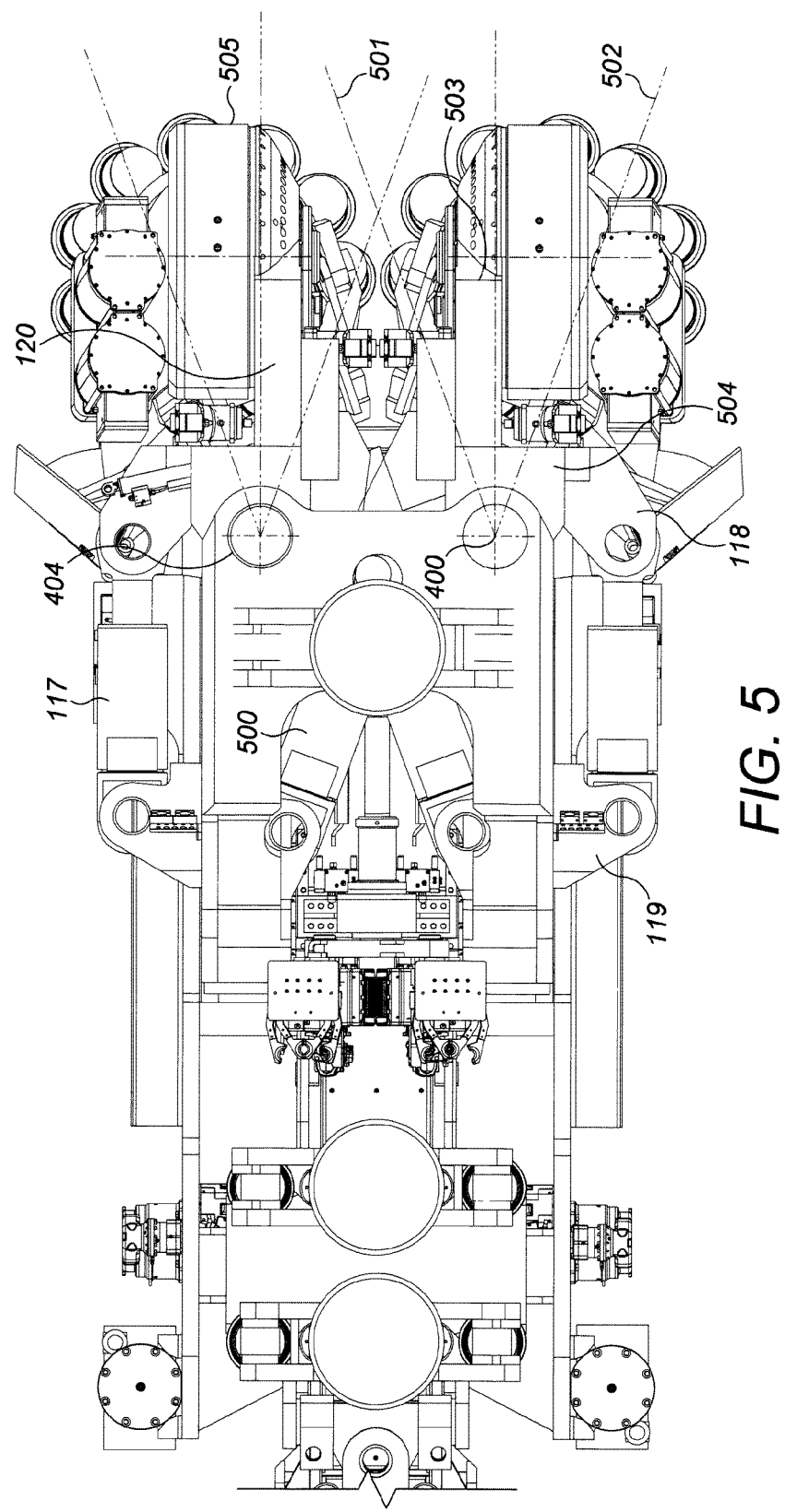
FIG. 5 is a plan view of the cutting apparatus of FIG. 4.

A corresponding second mount flange 119 projects laterally outward from a side of sled 104 immediately behind the first flange 118. A pair of linear hydraulic cylinders 117 are mounted to extend between flanges 118, 119 such that by linear extension and retraction, each support 120 is configured to pivot in the generally horizontal plane and in the lateral sideways direction relative to frame sides 302. Referring to figured 4, each support 120 is mounted at sled 104 via a pivot rod 404 extending generally vertically (when apparatus 100 is positioned on horizontal ground) through sled 104 and being suspended generally above the main frame forward end 303. Each support 120 is therefore configured to pivot or slew about pivot axis 400. Referring to FIG. 5, each support 120 is further coupled to a respective inner hydraulic cylinder 500 mounted at an inner region of sled 104 to cooperate with side mounted cylinders 117 to laterally slew each support 120 about pivot axis 400.

Figure 4:
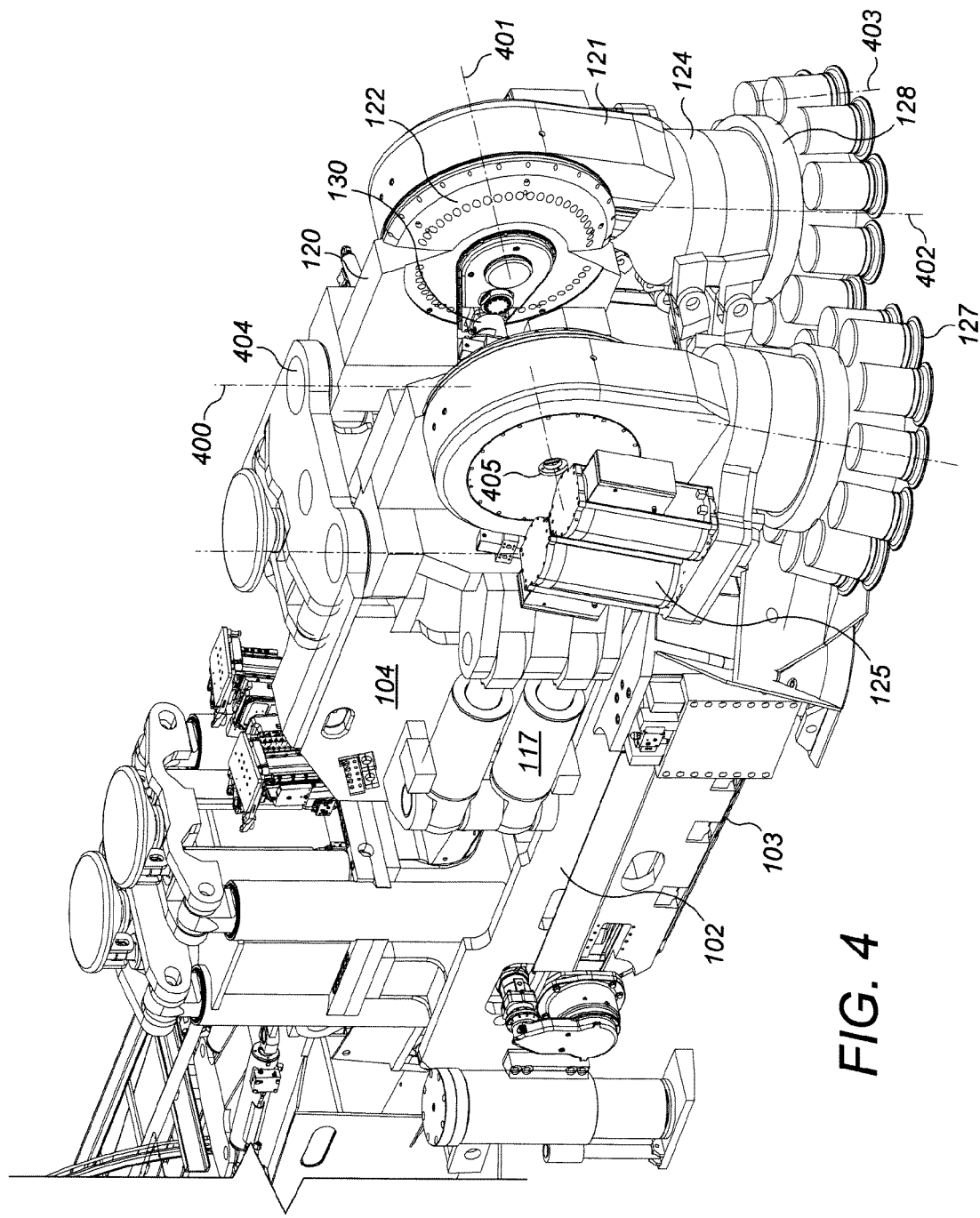
FIG. 4 is a magnified front perspective view of the cutting unit of the apparatus of FIG. 3.

Referring to FIGS. 4 and 5, as the respective pivot axes 400 are space apart in the widthwise direction of apparatus 100, supports 120 are capable of being slewed inwardly to a maximum inward position 501 and to be slewed laterally outward to a maximum outward position 502. According to the specific implementation, an angle between the inner and outer slewing positions 501, 502 is 20°.

Figure 7:
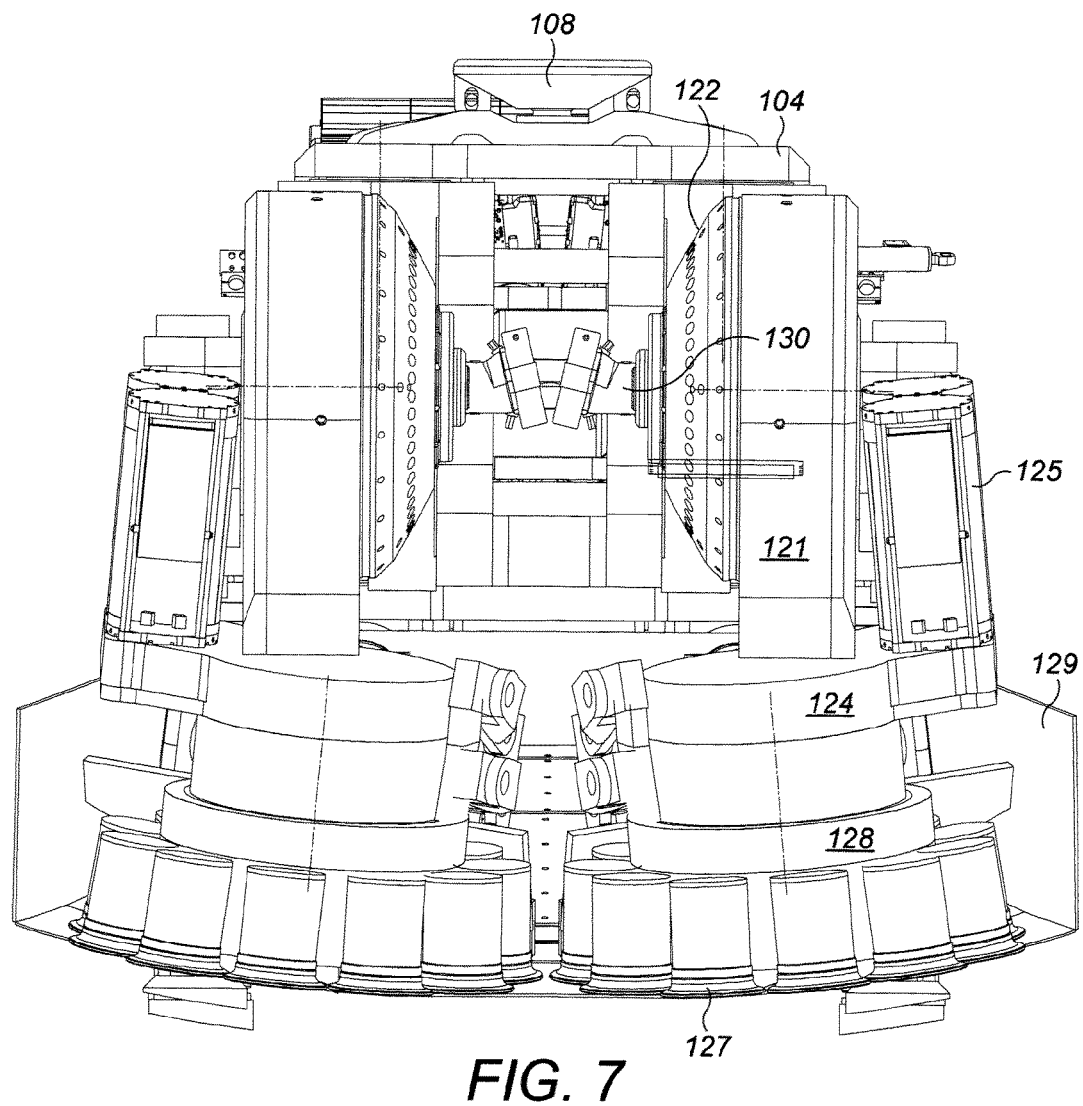
FIG. 7 is a front end view of the cutting apparatus of FIG. 6.

Referring to FIGS. 1 to 3, an arm 121 is pivotally mounted generally at the forward end 503 of each support 120. Each arm 121 comprises a cutting head 128 rotatably mounted at a distal end. Each cutting head 128 comprises a disk like (generally cylindrical) configuration. The plurality of generally annular or disc shaped roller cutters 127 are mounted at the circumferential perimeter of each head 128 and comprise a sharp annular cutting edge configured specifically for undercutting the rock. Cutters 127 are rotatably mounted independently relative to one another and head 128 and are generally free to rotate about their own axis. Each roller cutter 127 projects axially beyond a forwardmost annular edge of head 128 such that when arms 121 are orientated to be extending generally downward, roller cutters 127 represent a lowermost part of the entire head 128 and arm 121 assembly. Each arm 121 may be considered to comprise a length such that arm 121 is mounted at each respective support 120 at or towards a proximal arm end and to mount each head 128 at a distal arm end. In particular, each arm 121 comprises an internally mounted planetary drive indicated generally be reference 122. Planetary drive 122 preferably comprises a Wolfrom type drive and is coupled to a drive motor unit 130 via a drive train indicated generally by reference 123. A pair of drive motors 125 are mounted at the lateral sides of each arm 121 and are orientated to be approximately parallel with the rotational axis of each respective cutting head 128 as shown in FIG. 7. Each arm 121 further comprise an internal drive and gear assembly 124 coupled to a gear box 126 mounted at one end of each of the drive motors 125. Each cutting head 128 is driveably coupled to the drive motors 125 via the respective gear assembly 124 to provide rotation of cutting head 128 about axis 402.

Figure 6:
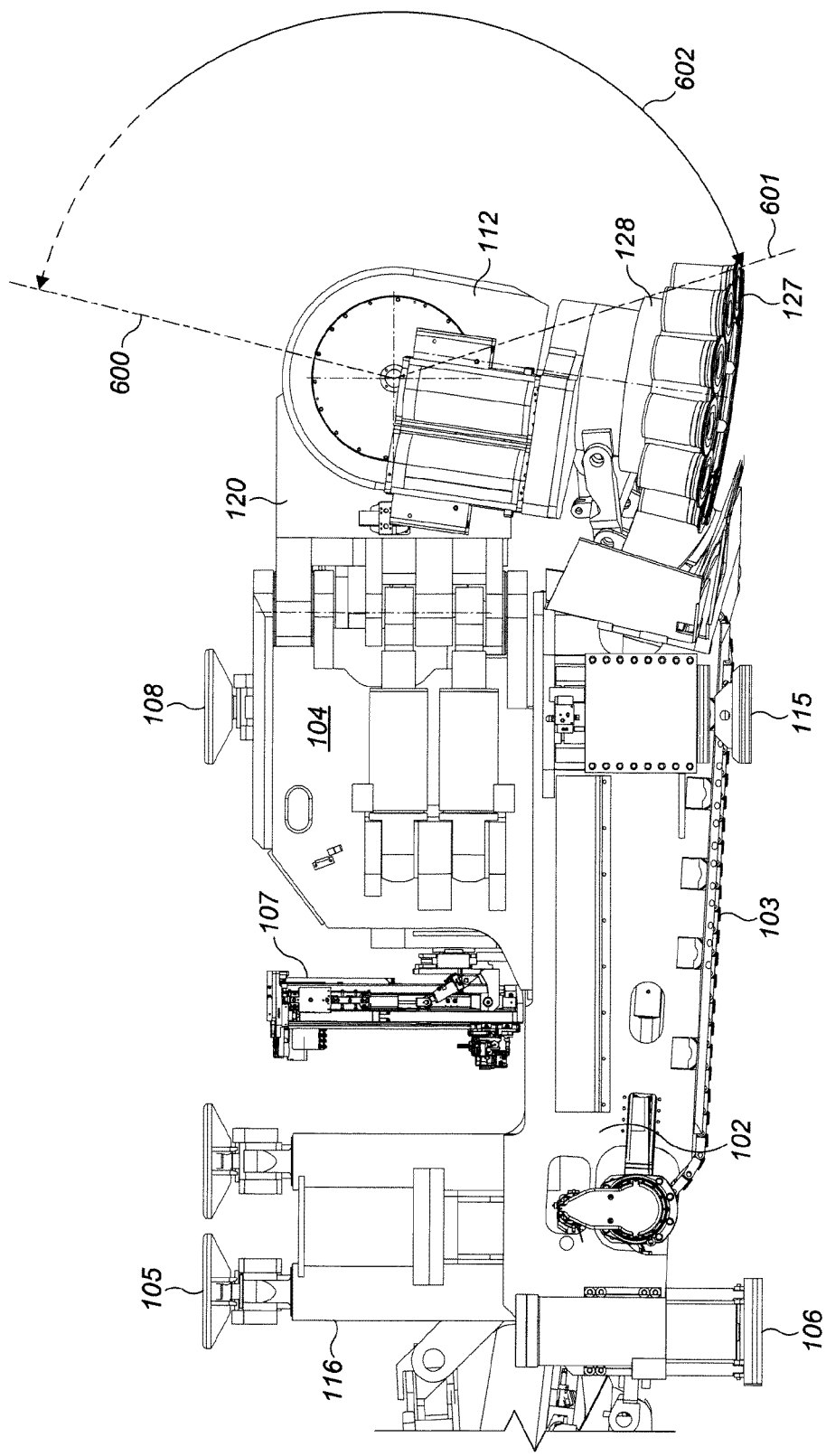
FIG. 6 is a side elevation view of the cutting apparatus of FIG. 5.

According to the specific implementation, and as shown in FIG. 7, each arm 121 is coupled to a respective motor unit 130 mounted at a forward end of sled 104. Each planetary gear 122 is centred on a pivot rod 405 having a pivot axis 401 referring to FIG. 4. Each axis 401 is aligned to be generally horizontal when apparatus 100 is positioned on horizontal ground. Accordingly, each arm 121 is configured to pivot (relative to each support 120, sled 104 and main frame 102) in the upward and downward direction (vertical plane) by actuation of each motor unit 130. As such, each cutting head 128 and in particular the roller cutters 127 may be raised and lowered along the arcuate path 602 referring to FIG. 6. In particular, each arm 121, head 128 and roller cutters 127 may be pivoted between a lowermost position 601 and an uppermost raised position 600 with an angle between positions 600, 601 being approximately 150°. When in the lowermost position 601, each roller cutter 127 and in particular head 128 is suspended in a declined orientation such that a forwardmost roller cutter 127 is positioned lower than a rearwardmost roller cutter 127. According to the specific implementation, this angle of declination is 10°. This is advantageous to engage the cutters 127 into the rock face at the desired attack angle to create the initial groove or channel during a first stage of the undercutting operation. Additionally, the extensive range of movement of the cutting heads 128 over the rock face is possible due, in part, to axis 401 being separated and positioned forward relative to axis 400 by a distance corresponding to a length of each support 120.

Referring to FIG. 4, each support pivot axis 400 is aligned generally perpendicular to each arm pivot axis 401. Additionally, a rotational axis 402 of each cutting head 128 is orientated generally perpendicular to each arm pivot axis 401. A corresponding rotational axis 403 of each roller cutter 127 is angularly disposed relative to cutting head axis 402 so as to taper outwardly in the downward direction. In particular, each roller cutter axis 403 is orientated to be aligned closer to the orientation of each cutting head rotational axis 402 and support pivot axis 400 relative to the generally perpendicular arm rotational axis 401.

Accordingly, each support 120 is configured to slew laterally outward in a horizontal plane about each support axis 400 between the extreme inner and positions 501, 502. Additionally and referring to FIG. 6, each respective arm 121 is configured to pivot in the upward and downward direction about arm pivot axis 401 to raise and lower the roller cutters 127 between the extreme positions 600, 601.

A gathering head 129 is mounted at main frame forward end 303 immediately rearward behind each cutting head 128. Gathering head 129 comprises a conventional shape and configuration having side loading aprons and a generally inclined upward facing material contact face to receive and guide cut material rearwardly from the cutting face (and cutting heads 128). Apparatus 100 further comprises a first conveyor 202 extending lengthwise from gathering head 129 to project rearwardly from frame rearward end 304. Accordingly, material cut from the face is gathered by head 129 and transported rearwardly along apparatus 100.

Referring to FIGS. 1 to 3, a detachable control unit 101 is mounted to the frame rearward end 403 via a pivot coupling 200. Control unit 111 comprises a personnel cabin 110 (to be occupied by an operator). Unit 111 further comprises an electric and hydraulic power pack 114 to control the various hydraulic and electrical components of apparatus 100 associated with the pivoting movement of supports 120 and arms 121 in addition to the sliding movement of sled 104 and the rotational drive of cutting heads 128.

Control unit 101 further comprises a second conveyor 112 extending generally lengthwise along the unit 101 and coupled at its forwardmost end to the rearwardmost end of first conveyor 202. Unit 101 further comprises a discharge conveyor 113 projecting rearwardly from the rearward end of second conveyor 112 at an upward declined angle. Accordingly, cut material is capable of being transported rearwardly from cutting heads 128 along conveyors 202, 112 and 113 to be received by a truck or other transportation vehicle.

In use, apparatus 100 is wedged between the tunnel floor and roof via jacking legs 106, 115 and roof grippers 105. Sled 104 may then be displaced in a forward direction relative to main frame 102 to engage roller cutters 127 onto the rock face. Cutting heads 128 are rotated via motors 125 that create the initial groove or channel in the rock face at a lowermost position. A first arm 121 is then pivoted about axis 401 via motor 130 to raise roller cutters 127 along path 602 to achieve the second stage undercutting operation. The first support 120 may then be slewed in the lateral sideways direction via pivoting about axis 400 and combined with the raising and lowering rotation of roller cutters 127 creates a depression or pocket within the rock immediately forward of the first arm 121 and support 120. The second arm 121 and associated head 128 and cutters 127 are then actuated according to the operation of the first arm 121 involving pivoting in both the vertical and horizontal planes. This sequential dual pivoting movement of the second arm 121 is independent of the initial dual pivoting movement of the first arm 121. A phasing and sequencing of the pivoting of arms 121 about axes 401 and supports 120 about axes 400 is controlled via control unit 111.

When the maximum forward travel of sled 104 is achieved, jacking legs 106, 115 are retracted to engage tracks 103 onto the ground. Tracks 103 are orientated to be generally declined (at an angle of approximately 10° relative to the floor) such that when ground contact is made, the roller cutters 127 are raised vertically so as to clear the tunnel floor. The apparatus 100 may then be advanced forward via tracks 103. Jacking legs 106, 115 may then be actuated again to raise tracks 103 off the grounds and grippers 105 moved into contact with the tunnel roof to repeat the cutting cycle. A forwardmost roof gripper 108 is mounted above sled 104 to stabilise the apparatus 100 when sled 104 is advanced in the forward direction via linear actuating cylinder 201.

Figure 8:
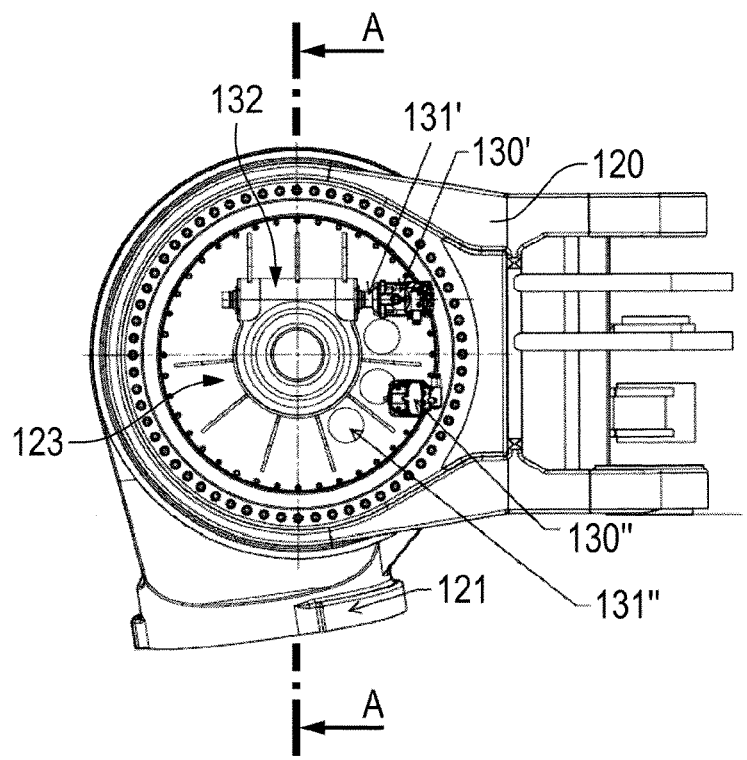
FIG. 8 shows a partial side view of the cutting apparatus of the cutting apparatus of the previous figures.
Figure 10:
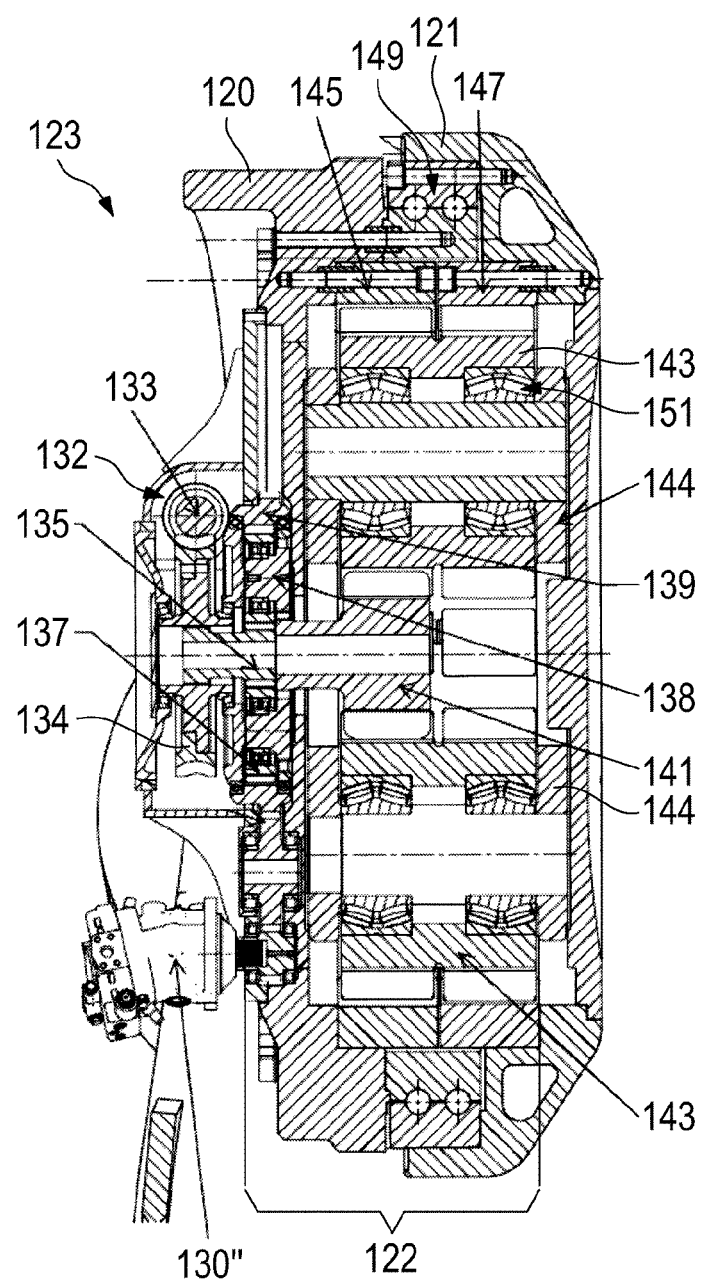
FIG. 10 is a cross-sectional view in plan A-A shown in FIG. 8.

FIG. 8 shows the support 120 and one of the arms 121 in an angled position. Arm 121 is pivoted about arm pivot axis 401 such that a cutting head 128 (cf. FIG. 4) would be facing downwards. The view shown in FIG. 8 shows the exterior of the drive train 123. The drive train 123 is actuated by a first drive motor 130' and a second drive motor 130", both of which form the drive motor unit 130 (FIG. 4). Preferably, both the first and second drive motors 130', 130" are hydraulic motors identically built. The first drive motor 130' is coupled for torque transmission to an auger drive 132. The auger drive 132 forms a first stage of the drive train 123. The second drive motor 130" is coupled for torque transmission to a planetary drive 122 (FIG. 10). The planetary drive 122 forms a second stage of the drive train 123.

The first stage of drive train 123 is engaged by a first brake 131' which might for example be coupled inbetween the first drive motor 130' and the auger drive 132. Preferably, the first brake 131' is a disc brake.

The cutting apparatus further comprises a second brake 131" adapted to engage the second stage of the drive train 123, e.g. the first hollow wheel 139.

Figure 9:
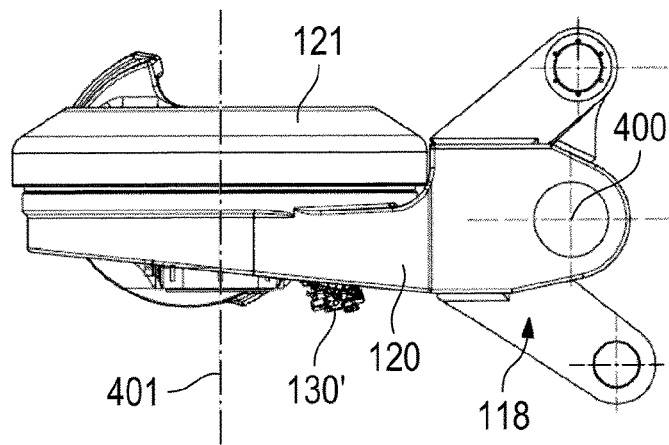
FIG. 9 is a top view projection of the cutting apparatus according to FIG. 8.

As can be seen from FIG. 9, the arm pivot axis 401 is substantially perpendicular to the support axis 400.

FIG. 10 provides more detailed information regarding the functioning principle of the drive train 123, in particular regarding the second stage (the planetary drive 122). Support 121 shall be assumed as stationary for the following description. For pivoting arm 121 relative to support 120 in a first operational mode, the auger drive 132 is actuated by the first drive motor 130'. The first drive motor 130' actuates an auger 133 which engages an auger wheel 134. The auger wheel 134 is mounted for torque transmission to a shaft carrying a sun wheel 135. The sun wheel 135 is the input element for the planetary drive 122. The sun wheel 135 engages a number of planetary wheels 137 which are held by planetary carriers 138. The planetary wheels 137 furthermore engage a first hollow wheel 139.

The planetary carriers 138 are engagingly coupled with a shaft carrying a second sun wheel 141. The second sun wheel 141 is the input element to a Wolfrom type drive. The second sun wheel 141 engages a number of planetary wheels 143 which are held by corresponding planetary carriers 144. The planetary wheels 143 engage a second hollow wheel 145 and an adjacently situated third hollow wheel 147. The second and third hollow wheels 145, 147 have an identical module corresponding to the module of the planetary wheels 143, but differ in their number of teeth. The second hollow wheel 145 is fixedly attached to the support 120, whereas the third hollow wheel 147 is fixedly attached to the arm 121 for torque transmission to the latter. The arm 121 is rotatably supported against the support 120 by way of a multi-row roller bearings 149 which preferably comprises two or more four-point bearing rows. Due to the difference in teeth between the second and third hollow wheel 145, 147, the third hollow wheel 147 rotates very slowly with respect to the second hollow wheel 145, driven by the rotation of the planetary carriers 144 and planetary wheels 143. The third hollow wheel 147 thus is the power output element of the drive train 123.

The planetary wheels 143 of the Wolfrom type drive are supported by a number of multi-rowed self-aligning bearings, such as spherical roller bearings 151.

In operation, for executing a first operational mode, the first hollow wheel 139 of the planetary drive 122 is immobilized by the second brake 131", while the first drive motor 130' drives the auger drive 132. The resulting transmission ratio hence is a multiplication of the individual transmission ratios of the auger drive 132 and the planetary drive 122.

When executing a second operational mode, preferably the first drive motor 130' is deactivated and/or the movement of the auger drive 132 is prevented by the first brake 131', while the second drive motor 130" causes rotation of the first hollow wheel 139 of the planetary drive 122 while the second brake 131" is deactivated. Now, the first sun wheel 135 is standing still, and the planetary carriers 138 are rotated via the revolving action of the first hollow wheel 139. Now, the overall transmission ratio of the drive train 123 does no longer include the transmission ratio of the auger drive 132. Consequently, the overall transmission ratio is reduced with respect to the first operating mode. This leads to comparatively higher velocity of the third hollow wheel 147, i.e. of the arm 121 with respect to the support 120, while the torque transmitted by the third hollow wheel 147 is lower than in the first operational mode.

As is evident from FIG. 10, the drive train 123 in all is extremely compact and robust in design while at the same time allowing for flexible control and immense transmission ratios.

In preferred embodiments, each stage of the planetary drive 122 comprises three planetary wheels.

EXEMPLARY EMBODIMENTS

Embodiment 1

Cutting apparatus (100) suitable for creating tunnels or subterranean roadways and the like comprising:
a main frame (102) having generally upward (300), downward (301) and side (302) facing regions;
a first and second support (120) pivotally mounted relative to the main frame (102) via respective first and second support axes (400) aligned generally upright relative to the upward (300) and downward (301) facing regions such that each first and second support (120) is configured to pivot laterally in a sideways direction relative to the side (302) facing regions;
at least one first and second support actuator (117) to respectively actuate independently movement of each of the first and second supports (120) relative to the main frame (102);
a first and second arm (121) each pivotally mounted to the respective first and second (120) support via a respective arm pivot axis (401) aligned in a direction extending transverse including perpendicular to each support pivot axis (400) to enable the first and second arms (121) to pivot independently of one another and to pivot relative to each of the respective first and second supports (120) in an upward and downward direction relative to the upward (300) and downward (301) facing regions;
at least one first and second arm actuator (122, 130) to actuate independently pivoting movement of the first and second arms (121) relatives to each of the respective first and second support (120);
a rotatable cutting head (128) mounted at each of the first and second arms (121), each head (128) rotatable about a head axis (402) orientated to extend substantially transverse to each respective arm pivot axis (401).

Embodiment 2

The apparatus of embodiment 1 wherein each cutting head comprises a generally annular cutting edge or layered cutting edges to provide an undercutting mode of operation.

Embodiment 3

The apparatus of embodiment 1 or 2 further comprising a plurality of roller cutters (127) independently rotatably mounted at each rotatable cutting head (128).

Embodiment 4

The apparatus of embodiment claim 3 wherein the plurality of roller cutters (127) are generally annular roller cutters each having a generally annular cutting edge or layered cutting edges to provide an undercutting mode of operation.

Embodiment 5

The apparatus of any one of the preceding embodiments wherein each of the first and second arm actuator (122, 130) comprises a planetary gear assembly mounted at the junction at which each arm (121) pivots relative to each support (120).

Embodiment 6

The apparatus of any one of the preceding embodiments wherein at least one of the first and second arm actuator (122, 130) comprises at least one first drive motor to drive the pivoting movement of the first and/or second arm (121) relative to the respective first and second support (120).

Embodiment 7

The apparatus of any one of the preceding embodiments further comprising at least one second drive motor (125) to drive rotation of the cutting head (128) at the first and/or the second arm (121).

Embodiment 8

The apparatus of any one of the preceding embodiments wherein the first and second support actuator (117) comprises a hydraulic linear actuator.

Embodiment 9

The apparatus of any one of the preceding embodiments further comprising a powered sled (104) movably mounted at the main frame (102) to be configured to slide in a forward cutting direction of the apparatus (100) relative to the main frame (102).

Embodiment 10

The apparatus of embodiment 9 wherein each of the first and second cutting head (128) is mounted at the sled (104) via the respective first and second arms (121) and supports (120) so as to be configured to advance in the forward cutting direction.

Embodiment 11

The apparatus of any one of the preceding embodiments wherein:
each of the first and second arms (121) is configured to pivot in the upward and downward direction by up to 180°;
and each of the first and second supports (120) is configured to pivot in the lateral sideways direction by up to 90°.

Embodiment 12

The apparatus of any one of the preceding embodiments further comprising tracks (103) or wheels mounted at the main frame (102) to allow the apparatus (100) to move in a forward and rearward direction.

Embodiment 13

The apparatus of any one of the preceding embodiments further comprising floor and roof engaging members (106, 115, 105, 108) mounted at the main frame (102), at least the floor engaging members (106, 115) being extendable and retractable to respectively raise and lower the apparatus (100) in the upward and downward direction.

Embodiment 14

The apparatus of any one of the preceding embodiments further comprising:
a first material discharge conveyor (202) to convey cut material rearwardly from the first and second cutting head (128); and a gathering head (129) to direct cut material onto the conveyor (202), the gathering head (129) positioned rearwardly behind at least one of the first and second cutting heads (128).

Embodiment 15

The apparatus of embodiment 14 further comprising a control unit (101) demountably connectable to the apparatus (100), the control unit (101) comprising operational components (114) to power at least the first and second support (120) and arm actuators (122, 130), the control unit (101) further comprising a second conveyor (112) to receive material from the first conveyor (202) and to discharge the material at a position rearward of the apparatus (100) and the control unit (101).

Embodiment 16

Cutting apparatus (100) suitable for creating tunnels or subterranean roadways and the like comprising:
a main frame (102) having generally upward (300), downward (301) and side (302) facing regions;
a powered sled (104) movably mounted at the main frame (102) to be configured to slide in a forward cutting direction of the apparatus (100) relative to the main frame (102);
a first and second arm (121) pivotally mounted to the sled (104) by respective pivot arm axes (401) aligned in a direction extending transverse including perpendicular to a longitudinal axis of the main frame (102) to allow each arm (121) to pivot independently of one another in an upward and downward direction relative to the upward and downward facing region of the main frame (102);
at least one first and second arm actuator (122, 130) to actuate independent pivoting movement of the first and second arms (121) relative to one another and the main frame (102);
a rotatable cutting head (128) mounted at each of the first and second arms (121) so as to be configured to be moved in the upward and downward direction and advanced in the forward cutting direction, each head (128) rotatable about a head axis (402) orientated to extend substantially transverse to respective pivot arm axes (401).

Embodiment 17

The apparatus of embodiment 16 wherein each first and second arm (121) together with the respective pivot arm axes is respectively mounted to the sled (104) via a first and second support (120) that is slidably mounted relative to the sled (104) via a common or respective slidable means such that each first and second support (120) is configured to slide laterally in a sideways direction relative to the side facing regions (302).

Embodiment 18

The apparatus of embodiment 16 or 17 wherein each rotatable cutting head (128) comprises a generally annular roller cutter (127) each having a generally annular cutting edge or layered cutting edges to provide an undercutting mode of operation.

Embodiment 19

The apparatus of any one of embodiments 16 to 18 further comprising a plurality of roller cutters (127) independently rotatably mounted at each rotatable cutting head (128).

Embodiment 20

The apparatus of embodiment 19 wherein the plurality of roller cutters (127) are generally annular roller cutters each having a generally annular cutting edge or layered cutting edges to provide an undercutting mode of operation.

Embodiment 21

The apparatus of any one of embodiments 17 to 20 wherein each of the first and second arm actuator (122, 130) comprises a planetary gear assembly mounted at the junction at which each arm (121) pivots relative to each support.

The features of the embodiments presented hereinabove are understood to be, alone or in combination with each other, preferred embodiments of the invention in themselves as well as in combination with what is claimed hereinafter.

The invention claimed is:

1. A cutting apparatus suitable for creating tunnels or subterranean roadways and the like comprising:
   at least one arm pivotally mounted to the apparatus and arranged to pivot in an upward and downward direction;
   at least one arm actuator arranged to actuate pivoting movement of the at least one arm, wherein the actuator includes a drive motor unit; and
   a drive train coupled to the drive motor unit, the drive motor unit and drive train being configured for selective operation in one of: a first operating mode in which a first pivoting velocity and a first torque are transmitted to the at least one arm, or a second operating mode in which a second velocity and a second torque are transmitted to the at least one arm, the first velocity being lower than the second velocity and the first torque being higher than the second torque, wherein the drive motor unit includes a first drive motor and a second drive motor, the first drive motor applying torque to the drive train in the first operating mode, and the second drive motor applying torque to the drive train in the second operating mode.

2. The cutting apparatus of claim 1, wherein the drive train includes an auger drive and a planetary drive coupled to the auger drive in series.

3. The cutting apparatus of claim 2, wherein the planetary drive includes a first stage planetary drive, the drive train including at least a second stage planetary drive coupled in series to the first stage planetary drive.

4. The cutting apparatus of claim 3, wherein the second stage planetary drive is a Wolfrom type drive.

5. The cutting apparatus of claim 3, further comprising a third stage planetary drive coupled in series to the second stage planetary drive.

6. The cutting apparatus of claim 2, wherein the auger drive includes an auger, the first drive motor being coupled to the auger.

7. The cutting apparatus of claim 2, wherein the planetary drive includes a first hollow wheel, the second drive motor being coupled to the first hollow wheel.

8. The cutting apparatus of claim 1, further comprising a first brake configured to prevent any torque transmission from the first drive motor to the at least one arm.

9. The cutting apparatus of claim 8, further comprising a second brake configured to prevent any torque transmission from the second drive motor to the at least one arm.

10. The cutting apparatus of claim 7, wherein the drive train includes a second hollow wheel and a third hollow wheel, both associated with the second stage planetary drive, wherein the second and third hollow wheels have an identical gear module, and the number of teeth of the second hollow wheel differs from the number of teeth of the third hollow wheel.

11. The cutting apparatus of claim 10, wherein the difference in teeth is in the two-digit range or less.

12. The cutting apparatus of claim 1, wherein in the first operating mode, a gear transmission ratio of the drive train is in the range of 5,000 to 10,000 and/or in the second operating mode, the gear transmission ratio of the drive train is in the range of 500 to 2,000.

13. The cutting apparatus of claim 1, wherein the first and second drive motors are hydraulic motors and/or identical motors.

14. The cutting apparatus of claim 1, further comprising a rotatable cutting head mounted at the at least one arm, the cutting head being rotatable about a head axis orientated to extend substantially transverse to an arm pivot axis.

15. The cutting apparatus of claim 1, wherein the at least one arm is a first arm, and further comprising a second arm pivotally mounted to the apparatus, the first and second arms being arranged to pivot independently of one another in an upward and downward direction.

16. The cutting apparatus of claim 1, wherein the at least one arm is a first arm, and further comprising:
a second arm pivotally mounted to the apparatus;
a main frame having generally upward, downward and side facing regions;
a first and second support pivotally mounted relative to the main frame via respective first and second support axes aligned generally upright relative to the upward and downward facing regions such that each first and second support is configured to pivot laterally in a sideways direction relative to the side facing regions; and
at least one first and second support actuator arranged to respectively actuate independently movement of each of the first and second supports relative to the main frame, wherein the first and second arms are each pivotally mounted to the respective first and second supports via a respective arm pivot axis aligned in a direction extending transverse including perpendicular to each support pivot axis to enable the first and second arms to pivot independently of one another and to pivot relative to each of the respective first and second supports in an upward and downward direction relative to the upward and downward facing regions, the at least one first and second arm actuators being arranged to actuate independently the pivoting movement of the first and second arms relative to each of the respective first and second support.

17. The cutting apparatus of claim 10, wherein the difference in teeth is between 1 and 5.

18. The cutting apparatus of claim 15, further comprising at least first and second arm actuator arranged to actuate independently the pivoting movement of each of the first and second arms.

19. The cutting apparatus of claim 15, wherein a rotatable cutting head is mounted at each of the first and second arms, each head being rotatable about a head axis orientated to extend substantially transverse to each respective arm pivot axis.

* * * * *